United States Patent [19]

Shigihara

[11] Patent Number: 4,988,156
[45] Date of Patent: Jan. 29, 1991

[54] BENT WAVEGUIDE FOR AN OPTICAL INTEGRATED CIRCUIT

[75] Inventor: Kimio Shigihara, Itami, Japan
[73] Assignee: Mitsubishi Denki Kabushiki Kaisha, Japan
[21] Appl. No.: 238,530
[22] Filed: Aug. 31, 1988

[30] Foreign Application Priority Data

Sep. 2, 1987 [JP] Japan ................................ 62-219824

[51] Int. Cl.$^5$ ................................................ G02B 6/10
[52] U.S. Cl. ................................ 350/96.12; 350/96.11
[58] Field of Search ............... 350/96.11, 96.12, 96.15, 350/96.29, 96.30

[56] References Cited

U.S. PATENT DOCUMENTS 4,787,689 11/1988 Korotky et al. ................. 350/96.12

FOREIGN PATENT DOCUMENTS 3214471 10/1983 Fed. Rep. of Germany ... 350/96.12

OTHER PUBLICATIONS

Kawakami et al, "Bending Losses of Dielectric Slab Optical Waveguide with Double or Multiple Claddings: Theory", vol. 14, No. 11, Nov., 1975.
Shiina et al, "Waveguide-Bend Configuration with Low-Loss Characteristics", Optical Letters, vol. 11, Nov. 1986, pp. 736-739.

Primary Examiner—Frank Gonzalez
Attorney, Agent, or Firm—Leydig, Voit & Mayer

[57] ABSTRACT

A bent waveguide for an optical integrated circuit includes a core region, cladding regions disposed at both sides of the core regoin forming a waveguide including a bent portion comprising the core region and the cladding region, a local waveguide region in the cladding region at the inner side of the bent portion. The local waveguide region has a larger refractive index than that of the core region or than that of the cladding region.

7 Claims, 2 Drawing Sheets

F I G. 3.
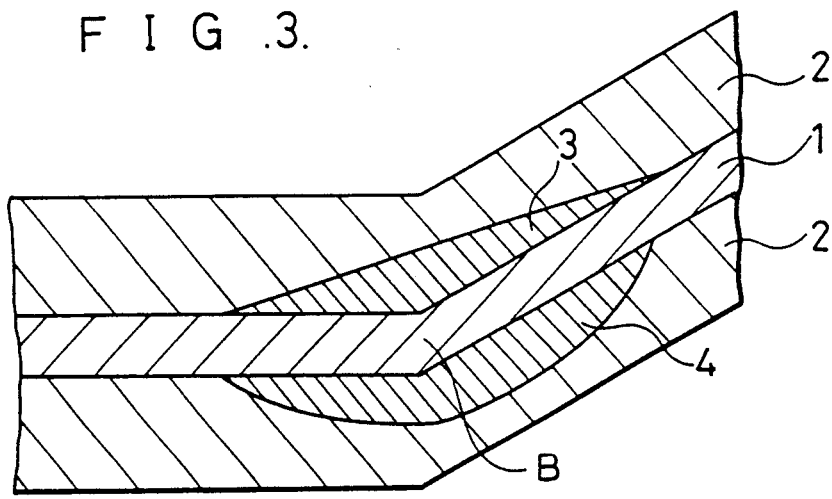

BENT WAVEGUIDE FOR AN OPTICAL INTEGRATED CIRCUIT

FIELD OF THE INVENTION

The present invention relates to a bent waveguide for an optical integrated circuit capable of reducing light wave radiation at the bent portion thereof.

BACKGROUND OF THE INVENTION

FIG. 4 is a plan view showing a prior art bent waveguide for an optical integrated circuit.

In FIG. 4, reference numeral 1 designates a core region, and reference numeral 2 designate cladding regions provided at the both sides of the core region 1.

In this prior art bent waveguide, light which is incident from the left side in the drawing and advances toward the right side is radiated or scattered at the neighbourhood of the bent portion B.

FIG. 5 shows the transition of electric field distributions at each 10 micron interval in a case where a light having waveguide mode of $TE_0$ is incident on the bent waveguide. In this case, refractive index $n_1$ of core region 1 is 1-5, refractive index $n_2$ of cladding region 2 is 1.49, and the wavelength is 1 micron. The electric field distributions after the light wave propagates through the bent portion B are gradually tapered toward outside, which means that the light wave is radiated. The coupling coefficient between the electric field distribution and $TE_0$ waveguide mode after the light wave propagates through the bent portion B is about 37% due to the high rate of light wave radiation in the neighbourhood of the bent portion B.

In this prior art bent waveguide for an optical integrated circuit, light is radiated at a high rate in the neighbourhood of the bent portion B, thereby resulting in difficulty in realizing an optical integrated circuit.

SUMMARY OF THE INVENTION

It is an object of the present invention to provide a bent waveguide for optical integrated circuits capable of reducing light wave radiation at the bent portion.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, a local waveguide region having a larger refractive index than that of the core region and larger than that of the cladding region is provided in the cladding region at the neighbourhood of the inner side of the bent portion. Accordingly, light which propagates in the neighbourhood of the bent portion is strongly confined in the local waveguide region and the core region, and is deflected toward the inner side of the bent portion.

DETAILED DESCRIPTION OF THE DRAWINGS

FIG. 3 is a cross-sectional schematic view of a bent waveguide for an optical integrated circuit according to another embodiment of the present invention;

DETAILED DESCRIPTION OF THE PREFERRED EMBODIMENTS

An embodiment of the present invention will be described with reference to FIG. 1.

Figure 1:
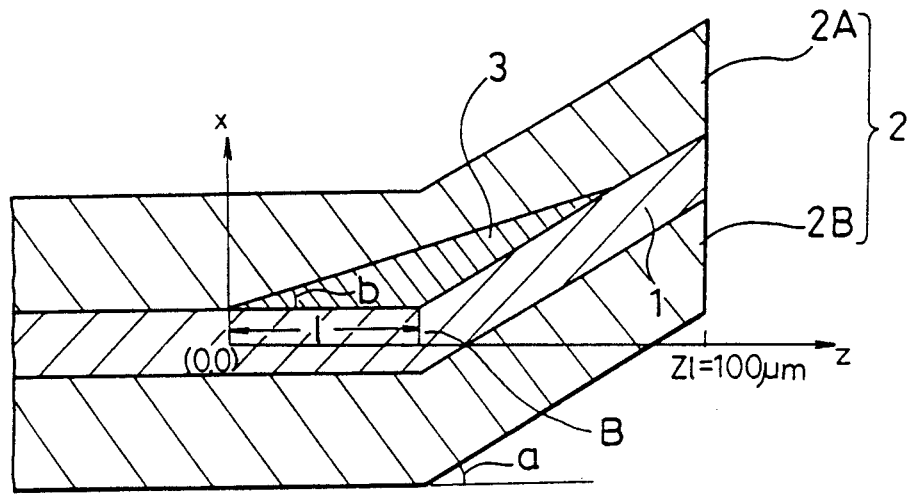
FIG. 1 is a cross-sectional schematic view of a bent waveguide for an optical integrated circuit according to an embodiment of the present invention.
Figure 2:
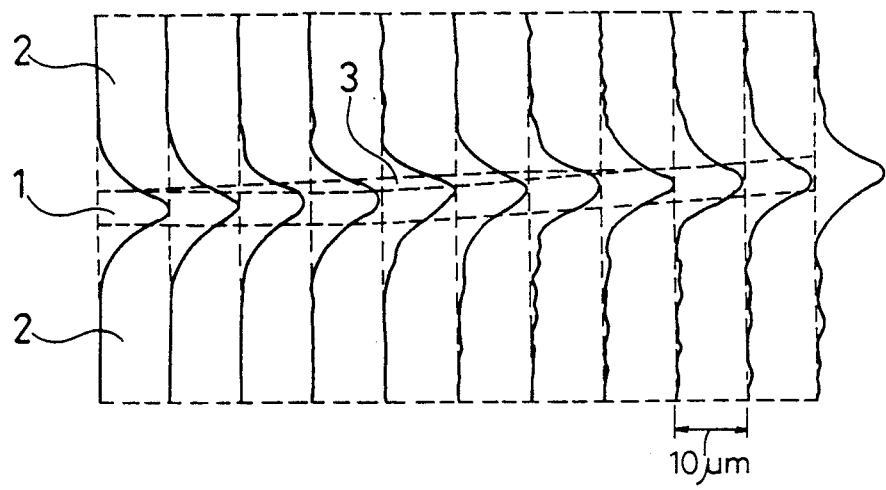
FIG. 2 is a diagram showing the amplitude distribution of a light wave which propagates in the bent waveguide of FIG. 1.
Figure 4:
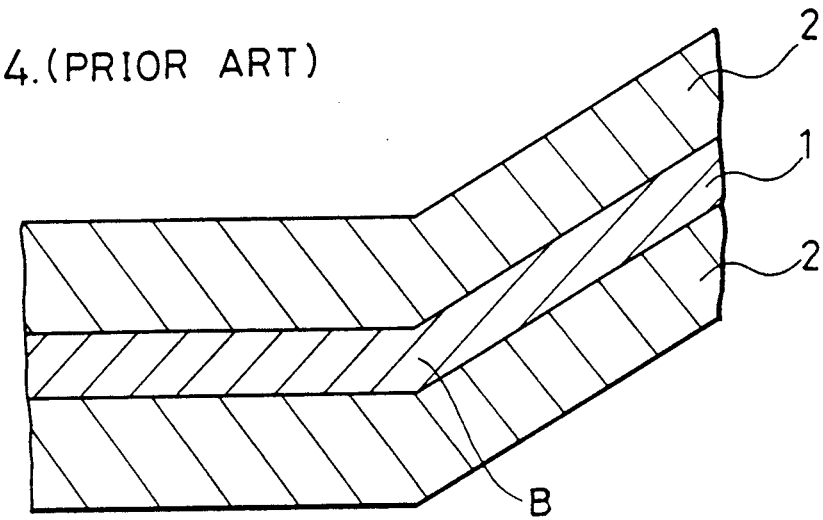
FIG. 4 is a cross-sectional schematic view of a prior art bent waveguide for an optical integrated circuit.
Figure 5:
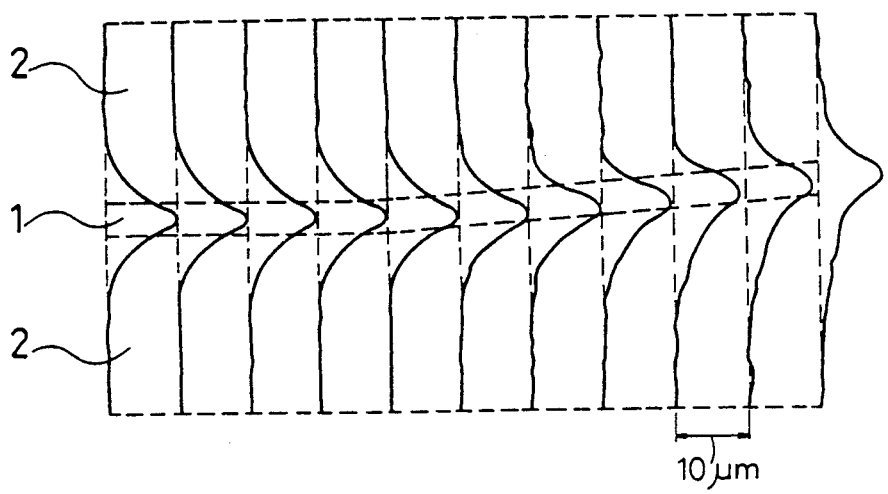
FIG. 5 is a diagram showing the amplitude distribution of a light wave which propagates through the bent waveguide of FIG. 4.

In FIG. 1, reference numeral 1 designates a core region of a bent waveguide. Reference numeral 2 designates a cladding region disposed at both sides of the core region 1 so the core region 1 is, between the cladding region. Cladding region 2 comprises an inner side portion 2A and an outer side portion 2B. A local waveguide region 3 is disposed at the inner side portion 2A of cladding region 2 in the neighbourhood of the bent portion B. Herein, the refractive indices of core region 1, cladding region 2, and local waveguide region 3 are $n_1$, $n_2$, and $n_3$, respectively, and they are chosen such that $n_1 > n_2$, and $n_3 > n_1$, i.e., $n_3 > n_2$. This local waveguide region 3 is produced by partially bending the waveguide at an angle of 1° at a position spaced by $l = 40$ microns from the point of bending. This local waveguide region 3 strongly confines a light wave which propagates in the neighbourhood of the bent portion B and deflects the light wave to the inner side of the bent portion B.

As material for the core region 1, the cladding region 2, and the local waveguide region 3, dielectric materials such as glass ($SiO_2$), $LiNbO_3$ or $LiTaO_3$ may be used and semiconductors such as AlGaAs, InGaAsP may be used. In any case, the respective regions 1, 2, 3 can be obtained by differentiating the refractive indices of the respective regions. For example, in case of using $LiNbO_3$, titanium diffusion or proton exchange can be utilized to differentiate the refractive index. When the amount of titanium diffusion or proton interchanging is increased the refractive index is increased. In case of using AlGaAs, when the amount of Al is increased, the refractive index is increased.

The coupling coefficient between the electric field distribution and the $TE_0$ waveguide mode following the bending is calculated from the formula (1).

$$\eta = \frac{\left| \int_{-\infty}^{\infty} E(x,zl) \cdot E_0(x,zl) dx \right|^2}{\left| \int_{-\infty}^{\infty} E(x,zl) dx \right|^2 \cdot \left| \int_{-\infty}^{\infty} E_0(x,zl) dx \right|^2} \quad (1)$$

Herein, $E_0(x,zl)$ is an electric field distribution of the $TE_0$ mode at the emitting end of $zl = 100$ microns as shown in FIG. 1 and the $E(x,zl)$ is an electric field distribution at $z = zl$ calculated by utilizing PBM (Propagating Beam Method). The above-described integration is conducted by numerical calculation.

In this case the coupling coefficient becomes about 68%, showing a great improvement over the prior art device.

The operational principle of this embodiment is as follows.

The $TE_0$ mode light which has reached the local waveguide region 3 is deflected toward the inside of the bent portion B because the refractive index $n_3$ of the local waveguide region 3 is larger than the refractive index $n_2$ of the cladding region 2 and larger than the refractive index $n_1$ of the core region 1. Accordingly, radiation in the neighbourhood of the bent portion B is reduced.

FIG. 3 shows a bent waveguide according to another embodiment of the present invention. In this embodiment, a local cladding region 4 is disposed at the outside of the bent portion B. This local cladding region 4 is preferably disposed about several tens of microns forward and behind the bent portion B.

The refractive index $n_4$ of local cladding region 4 is less than the refractive index $n_2$ of cladding region 2. When the local cladding layer 4 is disposed in this way, the light at the bent portion B is further deflected toward the inside and the radiation from the bent portion B is further reduced. The coupling coefficient of this case varies to a great extent dependent on the configuration and the refractive index of the local cladding region.

As is evident from the foregoing description, according to the present invention, a local waveguide region having a larger refractive index than that of the core region of the bent waveguide and larger than that of the cladding region of the bent waveguide is disposed in the cladding region in the neighbourhood of the inner side of the bent portion B of the bent waveguide. Accordingly, the radiation from the bent portion B can be reduced and high density integration of optical integrated circuit can be realized.

What is claimed is:

1. A bent waveguide for an optical integrated circuit comprising:
   a core region having a first refraction index;
   first and second cladding regions having a second refractive index disposed on opposite sides of and sandwiching said core region to form a waveguide comprising said core region and said first and second cladding regions, said waveguide having a bent portion bending toward an inner side and away from an outer side; and
   a first local waveguide region disposed between and contiguous to said first cladding region and said core region at said inner side of said bent portion, said first local waveguide region having a third refractive index larger than said first and second refractive indices for reducing the loss of light from the core region at the bent portion.

2. A bent waveguide for an optical integrated circuit as defined in claim 1 comprising a second local waveguide region having a fourth refractive index disposed between and contiguous to said second cladding region and said core region at said outer side of said bent portion, said fourth refractive index being smaller than said second refractive index for reducing the loss of light from the core region at the bent portion.

3. A bent waveguide for an optical integrated circuit consisting of:
   a core region having a first refractive index;
   first and second cladding regions having a second refractive index disposed on opposite sides of and sandwiching said core region to form a waveguide comprising said core region and said first and second cladding regions, said waveguide having a bent portion bending toward an inner side and away from an outer side; and
   a first local waveguide region disposed between and contiguous to said first cladding region and said core region at said inner side of said bent portion, said local waveguide region having a third refractive index larger than said first and second refractive indices for reducing loss of light from the core region at the bent portion.

4. A bent waveguide for an optical integrated circuit consisting of:
   a core region having a first refractive index;
   first and second cladding regions, having a second refractive index, disposed on opposite sides of and sandwiching said core region to form a waveguide comprising said core region and said first and second cladding regions, said waveguide having a bent portion bending toward an inner side and away from an outer side;
   a first local waveguide region disposed between and contiguous to said first cladding region and said core region at said inner side of said bent portion, said first local waveguide region having a third refractive index larger than said first and second refractive indices for reducing loss of light from the core region at the bent portion; and
   a second local waveguide region having a fourth refractive index disposed between and contiguous to said second cladding region and said core region at said outer side of said bent portion, said fourth refractive index being smaller than said second refractive index, said first and second local waveguide regions reducing the loss of light from the core region at the bent portion.

5. A bent waveguide as defined in claim 1 wherein the first refractive index is larger than the second refractive index.

6. A bent waveguide as defined in claim 3 wherein the first refractive index is larger than the second refractive index.

7. A bent waveguide as defined in claim 4 wherein the first refractive index is larger than the second refractive index.

* * * * *

UNITED STATES PATENT AND TRADEMARK OFFICE
CERTIFICATE OF CORRECTION

PATENT NO. : 4,988,156

DATED : January 29, 1991

INVENTOR(S) : Kimio Shigihara

It is certified that error appears in the above-identified patent and that said Letters Patent is hereby corrected as shown below:

TITLE PAGE:

In item [57] Abstract, line 3, change "regoin" to --region--.

Column 3, line 42, change "refraction" to --refractive--.

Column 4, line 20, after "said" insert --first--.

Signed and Sealed this

Twenty-fifth Day of August, 1992

Attest:

DOUGLAS B. COMER

Attesting Officer     Acting Commissioner of Patents and Trademarks